Figure 1:
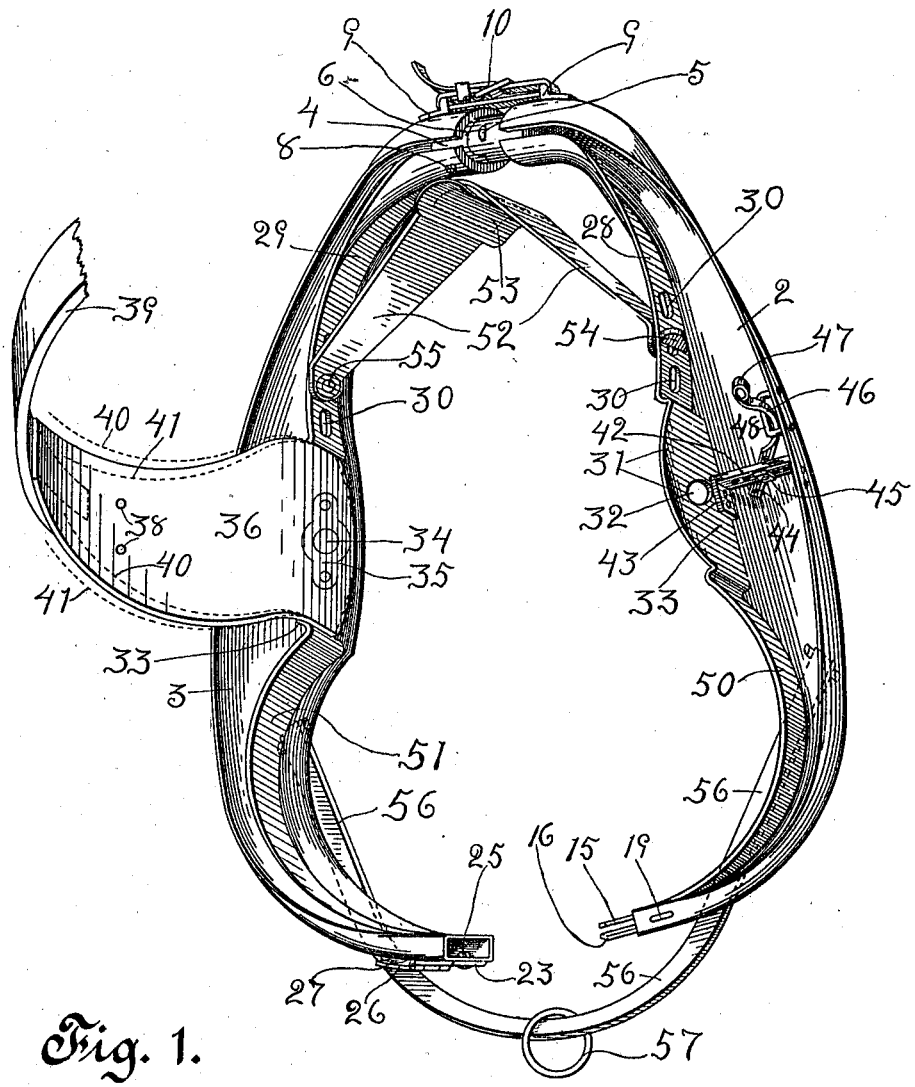

J. D. ABRAM.
HORSE COLLAR.
APPLICATION FILED SEPT. 1, 1909.
993,137.
Patented May 23, 1911.
2 SHEETS—SHEET 2.
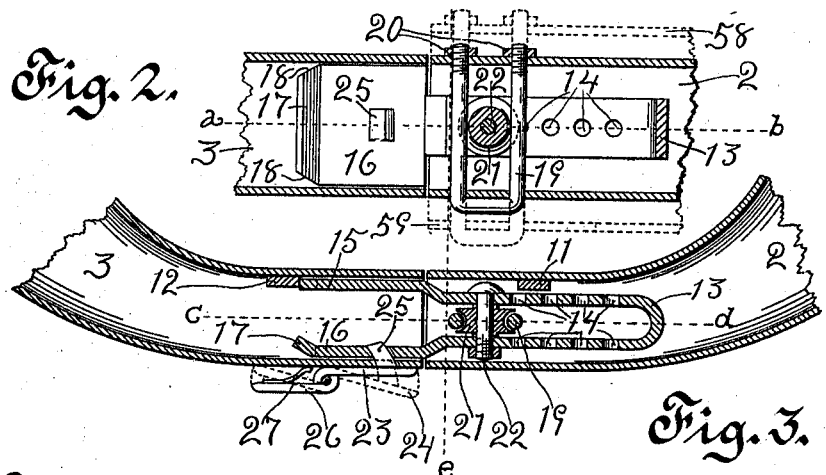
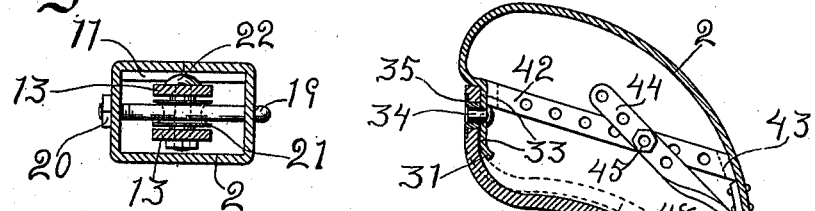
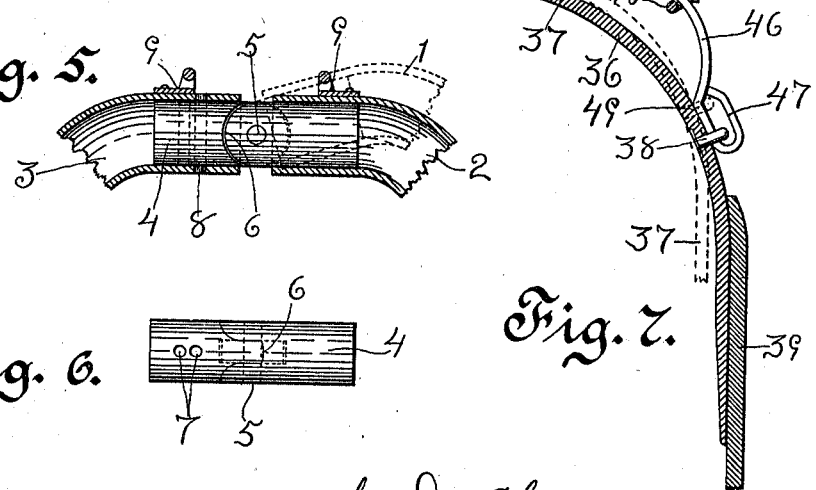
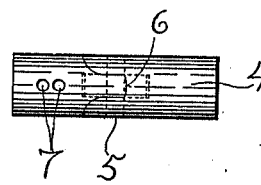
WITNESSES:
Marion O. Willson
Burl Vaughan
John D. Abram INVENTOR
BY Jno. Vaughan,
his ATTORNEY

UNITED STATES PATENT OFFICE.

JOHN DIXON ABRAM, OF DETROIT, MICHIGAN.

HORSE-COLLAR.

993,137.

Specification of Letters Patent.

Patented May 23, 1911.

Application filed September 1, 1909. Serial No. 515,719.

*To all whom it may concern:*

Be it known that I, JOHN DIXON ABRAM, a citizen of the United States, residing at Detroit, in the county of Wayne and State of Michigan, have invented certain new and useful Improvements in Horse-Collars, of which the following is a specification.

My invention relates to improvements in horse-collars connected with the draft rigging of a harness; and has for its objects, first, to limit the draft-pressure of the collar to the less prominent and muscular parts of the animal's shoulders; second, to attain automatic adjustment in height at the throat during draft and avoid the choking down of the animal, without resorting to great particularity in fitting the collar for vertical length; third, to facilitate the automatic continuous and independent adjustment of the opposite side-halves of the collar to the movements of the animal giving perfect freedom of shoulder action while traveling; fourth, to substitute a pad-tug for the ordinary collar-pad, after-wale or collar-belly, and provide an adjustable rigid support whereby said pad-tug is adjusted to different forms of shoulders; fifth, to provide a main collar body consisting of opposite side-halves connected laterally adjustable toward and from each other with a double jointed top and separable lock coupling at the bottom or throat; and sixth, to provide an independent adjustable support to retain the collar at the proper height while out of draft; these with other minor objects more fully hereinafter set forth, I attain by the mechanism illustrated in the accompanying drawing, in which—

Figure 1 is a perspective back and edge view of the collar uncoupled at the bottom or throat end, one of the pad-tugs being removed to disclose the contrivance for adjusting bending and supporting said pad-tugs; Fig. 2, is an enlarged detail plan of the coupling and locking device at the throat, taken on the broken line c—d of Fig. 3; Fig. 3 represents a vertical section on the broken line a—b of Fig. 2; Fig. 4, represents a vertical cross-section on the broken line e of Figs. 2 and 3; Fig. 5, is a front elevation of the hinge joint at the top of the collar, front portions of the tubed-ends of the side-halves 2 and 3 cut away to fully disclose the jointed cylindrical core; Fig. 6, is an under-side or top side view of the core 4 removed from the halves; and Fig. 7, is a horizontal cross-section through the attached pad-tug and half 2, at the place of the pivoting of the pad-tug to the collar half 2 and showing a plan or top view of the adjusting and supporting contrivance.

Throughout these several views the same part is indicated by a similar reference numeral.

In the horse-collar as generally constructed the after-wale, belly or draft-pad is nearly always substantially straight from bottom to top along the shoulder bearing. And if the side halves of the collar are not of themselves unbendable they are rendered so by the application of rigid hames between the fore and after wales of the collar. Therefore, in draft, greater pressure is brought against the top and bottom of the animal's shoulders, because of the prominence of the top or superior end of the scapula and its enlarged lower end at the point of articulation with the humerus—the shoulder joint.

In designing and constructing my collar I have proportioned and disposed the pad-tugs to bear against the intermediate natural cushion of muscles anteriorly crossing and lying along the central anterior and outside lateral depression of the scapula. And the attaching tables or pad-tug seats 33, through which the pivoted studs 34 are disposed and riveted to fasten the forward ends of said pad-tugs to the halves 2 and 3 of the collar, are disposed inwardly from the general inner line of the halves as shown, to bring the forward ends of said pad-tugs close to the sides of the animal's neck and thus utilize the full lateral bearing surface of these intermediate deep muscled portions of the shoulders.

The right and left halves 2 and 3 composing the body of my horse-collar are preferably made from blanks stamped from sheet metal and then each bent to the desired shape to form an integral half as shown. The top ends are turned inwardly toward each other and laterally bent into tube-shaped ends to telescopically inclose, slide and revolve on the cylindrical jointed coupling-core 4. The bottom ends are turned inwardly toward each other and bent laterally preferably to form rectangular butting tube-ends to receive the adjustable coupling and locking contrivance at the bottom or throat of the collar. The intermediate inner edges are bent rearwardly to form a flange disposed flatwise toward the animal's neck, and comprise the longitudinally curved top portions 28 and 29 having their lower ends curved inwardly toward each other, the longitudinally curved bottom portions 50 and 51 having their top ends curved inwardly toward each other and integral intermediate portions 33 and 33 vertically and longitudinally straight and rearwardly widened to form attaching tables for the pad-tugs. The remaining intermediate portions of the blanks, which are of greater width centrally to give the requisite strength and desired form, are laterally bent to form a rearwardly opening longitudinal concavity and forwardly and longitudinally disposed cross-convexed face as shown in Figs. 1 and 7.

The core 4 has near one end the vertical cross-perforations 7, to receive the pin 8 through corresponding perforations in the tubular top end of the half 3, whereby the longitudinal projection of said core is adjusted and its base end fastened in said tubular top. The opposite end of the core is close fitted to slide endwise in the tubular top end of the half 2 which is revoluble thereon. This core is also centrally jointed by the fork and tenon joint 6 having the pivot-pin 5 disposed horizontally and centrally across therethrough; whereby, either or both ends flex up or down carrying the halves 2 and 3 laterally out or in and allowing the throat ends of the collar halves to swing apart when they are unlocked or to swing together to close the collar. A plate-clip 9 is fastened on the top or front of the tubular top end of each half through which the adjusting and retaining strap-and-buckle 10 is disposed to retain the tubular ends at any laterally adjusted distance apart on said core and still allow the tubular end of part 2 to oscillate thereon in a plane forward and backward at right angles to the axis of the core.

The collar is adjusted and supported at the desired height on the animal's neck, irrespective of the collar length, by an interposed saddle:—This saddle comprises the broad pad-piece 53 to bear on the top of the animal's neck. This pad is fastened beneath the wide central portion of the leather pad-support 52. The pad-support has long tapered ends or stirrups the terminals of which are provided with the outwardly disposed T-headed buttons 54, the shanks of which buttons are pivoted to said terminals in the eyelets 55. The upper curved portions 28 and 29 of the collar flanges have the longitudinal slots 30, 30, etc., through which said buttons are inserted and the T-heads turned crosswise to fasten the ends of the pad support or stirrups and retain the saddle at the desired height in the collar to support the collar at the desired height on the animal's neck.

The two pad-tugs 36 36 are made of heavy pieces of leather of greater width at their forward ends where attached to the collar halves; their rear narrow ends are stitched or otherwise fastened to the ordinary draft-tugs 39. The intermediate straight portions 33 33 of the flanges on the halves 2 and 3 are disposed outwardly from the adjoining ends of the curved parts of the flanges above and below, offset sufficiently to form recessed seats of depth equal to the thickness of the pad-tug ends attached therein. The forward edge 31 of each seat is curved outwardly,—as shown by the shading in Fig. 1 and in cross-section in Fig. 7,—to ease the first bend in the pad-tug in fitting it to the shoulder and to avoid fracture thereof. Each pad-tug has a pivotal connection to the seat, consisting of an elongated reinforcing plate 35 disposed and fastened across the inner face of the pad-tug end. This plate has an integral central boss and a central perforation therethrough countersunk on the inner face of the plate. The pivotal rivet 34 is disposed through the central perforation 32 in the recessed seat, through the perforated boss and headed down smooth in the countersink on the inner face of the plate. Connected in this manner the free end of the pad-tug may swing up to the position indicated by the broken lines 40 40—in Fig. 1,—or down to that indicated by the broken lines 41 41, according to the direction of the draft.

The pad-tug adjusting and supporting contrivance consists of the brace or bridge-bar 42 disposed horizontally across the back concavity of the shaped collar-half and forward of the tug-pad,—as shown in Figs. 1 and 7; the ends of the bar are bent downward and the inner end riveted to the outside of the pad-tug attaching-seat and the outer end riveted near the outer curved edge of the half. This provides a central stay or cross-brace to the widest or central part of the half to prevent it from collapsing or becoming bent or distorted by the draft, or other hard usage. The adjusting-bar consists of the straight forward end portion 44 disposed across the bridge-bar; the bars each being provided with a longitudinal row of vertical perforations to receive the connecting bolt 45 through both bars; and the relative positions of the bars are changed by pairing different perforations, in the different bars, to receive the connecting-bolt. The central curved portion 46 of the adjusting-bar is disposed through the vertically-elongated clip 48 and curved rearwardly toward the pad-tug; this clip is fastened to project inwardly from the outer edge of the collar-half adjacent to the outer end of the brace- or bridge-bar; the adjusting-bar is loosely fitted to slide endwise through the clip and swing up and down therein; the connecting-bolt 45 being left loose to allow such vertical oscillatory movement. The rear end portion of the adjusting-bar is bent to form the horizontally disposed elongated loop 47; and the vertically elongated clip 38 projected from the outer surface of the pad-tug is disposed loosely through said loop; whereby, the clip may slide up and down through the loop and backward and forward therein. When the pad-tug is bent to the curve indicated by the broken lines 37 in Fig. 7, to fit a particular form of shoulder, the clip slides forward in the loop to the position indicated by the broken lines 49.

The butting bottom or throat rectangularly-tubed-ends of the halves 2 and 3, are coupled together, adjusted laterally toward and from each other and controlled to swing independently forward and backward while the throat is coupled and locked without affecting said lateral adjustment. The mechanism by which I attain these results is illustrated and detailed in Figs. 1, 2, 3 and 4:—The U-shaped coupling-bar is made by bending a narrow middle portion of a flat bar to form the looped end 13 which is adjustably fastened and carried in the tubed throat end of the half 2, with the legs of the bar or loop disposed one above the other. At all points of adjustment the end portions 15 and 16 of the legs project beyond the tubed-end 2 to form a coupling-bar-head for the lock-coupling with the correspondingly-tubed-end of the half 3.

The ends 15 and 16 of the legs are made wider than the looped end 13—see Fig. 2—and are spaced farther apart by an adjacent upward bend in the upper leg and a like downward bend in the lower leg—as shown in Fig. 3—to form a slip-head close fitted in the tubed-end 3. The terminals are finished with the clipped angles 18 to facilitate the insertion of the head. The lower end portion 16 has its terminal 17 bent upward to facilitate the insertion of the slip-head and to form an inclined plane to depress the spring-actuated locking lug 25. The cross-bars 11 and 12 reinforce and fasten the joined edges or seams of the tubes and the latter, 12, is impinged by the terminal of the upper end portion 15 to limit the inward movement of the head; stopping it at a point where a central opening in the end portion 16 registers with and receives said locking lug.

A pair of parallelly disposed guide-bars 19, which for convenience in handling are made of a single piece of round bar bent to a rectangular staple,—as shown in Fig. 2,—are disposed horizontally and centrally in height across through the tubed-end 2 near its terminal; they are fastened therein by the nuts 20 and 20 on the threaded projecting ends at the front. A grooved-rim pulley 21 is interposed between the guide-bars and is of size to loosely engage both guide-bars in its groove at its diametrically opposite edges, to revolve in a horizontal plane and travel horizontally forth and back in this guide-way across the inside of the tubed-end. This pulley is mounted between the top and bottom legs of the looped end 13 of the coupling-bar, to revolve on the vertical bolt-axle 22 disposed through both legs in one of the pairs of corresponding perforations 14, 14 etc. The length of the hub of the pulley is equal to the space between said legs to carry the coupling-bar steadily as it moves forward and backward in the tubed-end retained at the same relative position endwise by the pulley between said guide-bars. In like manner the tubed-end 2 moves backward, independently of the tubed-end 3 and the coupling-bar locked rigidly therein, to the position indicated by the broken lines 59—in Fig. 2—or to the opposite forward position indicated by the broken lines 58; at the same time being held in the same lateral adjustment by the guide-bars traveling in the groove of the pulley fastened in the loop of the coupling-bar. Thus, allowing the lower ends of the collar halves, which halves are revolubly connected by the cylindrical core joint at the top, to independently follow the alternate forward and backward movements of the opposite shoulders of the animal while traveling; thereby contributing to perfect freedom of action while drawing a heavy load; this, without disturbing the lateral adjustment of width of collar, as the throat ends move in parallel planes the same distance apart at all points in said forward and backward movements. By removing the guide-bars 19, the coupling-bar may be withdrawn from the tubed-end, and the pulley and bolt-axle shifted to different perforations 14, to attain the desired lateral adjustment for width of collar.

The locking device for the throat coupling consists of a centrally pivoted lever disposed on the underside of the tubed-end 3. The arm 23 is disposed toward the end and against the underside of the tubed-end and carries on its upper surface the upwardly projecting curved locking lug 25; a corresponding aperture through the lower wall of the tube allows the curved tapered lug to pass up through to engage the corresponding perforation in the head end 16. The oppositely disposed arm 26 is offset away from the tube and the spring 27 interposed in the space between the arm and tube and fastened to the arm to actuate the lever and retain the lug in locking position. Pressing the arm 26 toward the tube, against the action of the spring, throws the arm 23 down to the position indicated by the broken lines 24 to draw the locking lug out of engagement with the coupling-head which can then be withdrawn from the tubed-end 3 to open the collar.

Such ordinary clips as may be required to carry a strap 56 and ring 57 to support or guide a martingale or to carry the usual holdback-strap may be riveted to the front of the curved and bent halves as indicated or at such points as may be desired.

It is obvious that because of the vertically narrowed draft surface offered by the pad-tug it will during draft normally assume the position of the softer muscle-cushioned depression of the scapula or shoulder; therefore, the internal supporting saddle 53, is adjusted so as not to carry the collar any above the position it takes in draft, but preferably a little lower. By this means no great weight comes on top of the animal's neck, unless it be while standing still or in holding back the load in passing down an inclined road; during a forward pull both the top and bottom of the neck are free, if the collar is not too short. Further, the contact surface of the collar with the animal is reduced to the minimum, to just that part best utilized for the draft, and to the intermittent touch of the internal saddle; other parts stand away giving perfect ventilation, freedom of shoulder action, avoiding scalding galls and completely eliminating the causes of shoulder diseases arising from collar service.

The pivot connection of the pad-tugs to the halves not alone allows the pad-tugs to smoothly take the varied directions of draft, caused by varied heights of hitch, but prevents them from being wrinkled and distorted by the swinging action of the halves in following the movements of the shoulders of the animal while it is traveling.

The lateral axial alinement of the top pivoting of the full-length rigid side-halves prevents these halves from twisting or rolling independently of each other on the animal's shoulders and said pivoting is as nearly coincident with the pivoted or muscle-anchored tops or superior ends of the scapulæ as possible. And the throat coupling assists the pivotal connection of the side-halves to retain said halves in immovable endwise relation to each other. Therefore, the side-halves of the collar are not forced to slide endwise on the animal's shoulders, nor can they independently do so, when the inclination of the shoulders and the side-halves of the collar bearing thereon are changed in the vertical plane to different angles to the line of service draft by the animal taking steps; thereby preventing rub-galls as well as alternating misplaced or changing pressure.

I claim:

1. A collar comprising side-halves jointed together at their top ends to oscillate independently forward and backward, intermediate inwardly-projecting portions of said sides having inwardly-opening recesses, and vertically-swinging pad-tugs pivoted in said recesses.

2. A horse collar comprising side-halves jointed together at the tops to allow their lower or throat-ends to swing independently forward and backward and laterally inward toward or outward from each other, pad-tugs connected to said halves, and a coupling-bar connected to one of said halves to freely slide backward and forward thereon in a direction agreeing with the direction of the service draft on said collar and adapted to be separably and stationarily locked to the corresponding end of the opposite side-half to retain said ends in parallel planes the same lateral distance apart at all positions of forward and backward movement.

3. A horse collar comprising opposite side-halves double jointed together at their top ends to independently swing forward and backward and laterally away from each other at their lower ends, vertically-swinging pad-tugs pivoted to said side-halves, and a coupling-bar mounted on the lower end of one of said side-halves to freely slide forward and backward thereon in a direction agreeing with the direction of the alternating forward and backward movements of the animal's shoulders in traveling and said coupling-bar adapted to be releasably and stationarily locked to the lower end of the opposite side-half to retain said lower ends in parallel planes the same distance apart laterally at all points of their forward and backward movement.

4. A collar comprising side-halves double jointed together at their top ends to swing independently forward and backward and to swing laterally away from each other, central inwardly projecting portions of said side-halves having inwardly opening recesses, pad-tugs pivoted in said recesses, and a forwardly-and-backwardly-slidable coupling-bar attached to the throat end of one half and adapted to lock stationarily to the throat end of the opposite half.

5. A horse collar comprising rigid side-halves having at their tops opposed cylindrically tubed ends normally in axial alinement, a straight cylindrical coupling-core having one end fastened rigidly in one of said tubed-ends the other end disposed in the opposite tubed-end to slide endwise and revolve therein, and an intermediate hinge joint in said coupling-core between said tubed-ends to swing the lower ends laterally, only at right angles to the service draft through the collar.

6. A horse collar comprising rigid side-halves having at their tops opposed cylindrically tubed-ends normally in axial alinement transverse to the direction of the working draft through the collar, a cylindrical coupling-bar having one end rigidly fastened and adjustable in the direction of its length in the tubed-end of one side-half, the other end of said coupling-bar disposed to freely slide endwise and revolve in the tubed-end of the opposite side-half, an intermediate hinge joint in said coupling-bar between said tubed ends, and means to retain the slidable and revoluble end of said coupling-bar in said tubed-end.

7. A collar comprising side-halves having tubed-ends at the throat adapted to swing forward and backward on a pivotal joint at their top ends, a guide-way disposed backwardly and forwardly across through one tubed-end, a coupling-bar having one end adapted to be stationarily locked in the opposite tubed-end and the other end of said coupling-bar connected to follow said guideway.

8. A collar comprising side-halves having butting tubular throat-ends, a pair of guide-bars disposed forwardly and backwardly through one tubed-end, a coupling-bar having one end adapted to be stationarily locked in the opposite tubed-end, a grooved pulley pivoted to the opposite end of said coupling-bar and disposed to engage and travel forward and backward between said guide-bars.

9. A collar comprising side-halves having butting tubed-ends, a U-shaped coupling-bar having its looped end disposed in one of said tubed-ends, a grooved pulley mounted between the legs of the U on a bolt-axle disposed through both legs, a pair of guide-bars parallelly disposed across through said tubed-end and through the groove at opposite sides of said pulley to guide said pulley therebetween, and the free ends of said legs widened and spaced apart to form a close-fitting coupling-bar-head adapted to slip into and lock in the opposite tubed-end.

10. A collar comprising side-halves with opposed butting ends, a pair of parallel bars ranged forward and backward to form a guide-way fastened to one of said side ends, a laterally disposed coupling-bar having a longitudinal row of perforations and having a coupling-head adapted to be locked to the opposite side end, a grooved pulley adapted to engage and travel between the bars of said guide-way and mounted on a bolt-axle adapted to be shifted to different perforations in said coupling-bar.

11. A collar comprising side-halves meeting in opposed tubed-ends, a U-shaped coupling-bar consisting of a narrow looped end having a longitudinal row of oppositely-corresponding perforations in each leg of the loop and the ends of said legs widened and spaced apart to form a coupling-bar-head fitted for insertion in one of said tubed-ends, a lock on said tubed-end to fasten said head releasably therein, a pair of parallelly ranged bars disposed across through the opposite tubed-end and between the legs of said loop, and a pulley having a peripheral groove to engage said bars and travel therebetween and mounted in said loop on a bolt-axle disposed in corresponding perforations through opposite legs of the loop.

12. A collar comprising oppositely disposed sides, pad-tugs attached to said sides, laterally extended supports disposed forward of said pad-tugs, adjusting-bars having their rear ends connected to said pad-tugs and having their forward ends connected longitudinally and laterally adjustable to said supports.

13. A collar comprising sides each having a central portion concaved on its back surface, a pad-tug pivoted to the inner edge of said central portion, a brace-bar disposed across said concavity in front of said pad-tug and having a longitudinal row of perforations, an adjusting-bar having its rear end connected to said pad-tug and its forward end having a longitudinal row of perforations any one of which may be brought to register with any perforation of the brace-bar to receive a fastening bolt therethrough.

14. A collar comprising opposed sides each longitudinally concaved on its rear surface, a pad-tug pivoted to the inner edge of said side to swing edgewise vertically and flex flatwise outwardly, a brace-bar disposed across the concavity of the side in front of the outwardly flexed pad-tug, an adjusting-bar disposed loosely through a clip on the outer edge of said side its forward end having a laterally and longitudinally adjustable connection to said brace-bar and its rear end looped into a vertically elongated clip on the front or outer surface of said pad-tug.

15. A collar comprising opposed sides each longitudinally concaved on the back, a pad-tug fastened to the inner edge of said side to bend flatwise outwardly, a brace-bar disposed across the concavity of the side in front of said pad-tug, an intermediately-curved adjusting-bar disposed through a clip on the outer edge of said side its rear end connected to said pad-tug and its forward end having a laterally-and-longitudinally-adjustable connection to said brace-bar.

16. A collar comprising opposed side-halves with suitable couplings, inwardly-projecting portions centrally disposed on said halves, rearwardly-projecting flanges along the inner edges of said halves and inwardly-projecting portions, and pad-tugs attached to the flanges at said inwardly-projecting portions.

17. A horse collar, comprising full-length sheet-metal side-halves curved edgewise to form opposed meeting ends having suitable couplings, said halves of greater width at their longitudinal centers and bent concave in cross-section, rearwardly projecting flanges on the inner edges of said central concaved portions to form attaching-tables, brace-bars having their inner ends fastened to the outer surfaces of said attaching-tables and their outer ends fastened to the outer edges of said concaved portions, and pad-tugs fastened to said attaching-tables.

In testimony whereof I affix my signature in presence of two witnesses.

JOHN DIXON ABRAM.

Witnesses:
 PAUL McDONALD,
 LOUELLA ABRAM.

Copies of this patent may be obtained for five cents each, by addressing the "Commissioner of Patents, Washington, D. C."